March 1, 1949.  HENRI-GEORGES DOLL  2,463,362
AUTOMATIC CONTROL SYSTEM FOR VEHICLES
Original Filed July 17, 1943  4 Sheets-Sheet 1

INVENTOR.
HENRI-GEORGES DOLL
BY
ATTORNEY

March 1, 1949.   HENRI-GEORGES DOLL   2,463,362
AUTOMATIC CONTROL SYSTEM FOR VEHICLES
Original Filed July 17, 1943   4 Sheets-Sheet 3

Fig. 6.

INVENTOR.
HENRI-GEORGES DOLL
BY
ATTORNEY

March 1, 1949.  HENRI-GEORGES DOLL  2,463,362
AUTOMATIC CONTROL SYSTEM FOR VEHICLES
Original Filed July 17, 1943  4 Sheets-Sheet 4

Fig. 7.

INVENTOR.
HENRI-GEORGES DOLL
BY
ATTORNEY

Patented Mar. 1, 1949

2,463,362

UNITED STATES PATENT OFFICE 2,463,362

AUTOMATIC CONTROL SYSTEM FOR VEHICLES

Henri-Georges Doll, Houston, Tex.

Continuation of application Serial No. 495,093, July 17, 1943. This application filed February 7, 1947, Serial No. 727,141

15 Claims. (Cl. 318—489)

The present invention relates to steering control systems for moving bodies such as aircraft or ships, for example. More particularly, it relates to a new and improved steering control system for automatically maintaining a moving body on a predetermined course.

This application is a continuation of my copending application Serial No. 495,093 filed July 17, 1943, now abandoned, for Automatic control system for vehicles.

In prior type automatic steering systems, it has been proposed to compensate for deviations of a body from a preset course by adjusting the rudder or other steering control in accordance with the angle of deviation of the vehicle from its preset course. Systems of this type have not been found satisfactory because they do not take into account the angular velocity of the body about its center of gravity. As a result, any correction for a deviation from the course tends to produce undesirable oscillations of the body about its center of gravity.

In an effort to avoid these undesirable oscillations, steering control systems have been devised in which the rudder or other steering member is adjusted in accordance with the angular velocity of the body about its center of gravity as well as the angular deviation. Generally, the apparatus employed for this purpose is complicated in construction and includes many moving mechanical parts such as gears, cams and lever arms, for example. Because of the relatively large masses of the parts, apparatus of this type is subject to undesirable time lags resulting from inertia effects; moreover, it must be very carefully constructed and maintained if errors arising from mechanical defects and wear of the parts are to be avoided.

On the other hand, only very crude compensators have been proposed in the prior art; such compensators did not permit to combine the values of the "deviation angle" and of the "angular velocity" in a correct way to determine the desired "rudder angle." The best of them permitted only linear combinations of the "deviation angle" and of the "angular velocity" such as their sum or difference, for example, and such linear combinations, although they might result in decreasing the oscillation, would certainly not bring about the complete suppression of oscillation and overshooting which is achieved with the present invention.

It is an object of the present invention, accordingly, to provide a new and improved automatic steering control system which is free from the above noted defects of the prior art.

Another object of the invention is to provide new and improved steering control apparatus which is relatively light in weight and simple and rugged in construction.

A further object of the invention is to provide a new and improved steering control apparatus of the above character in which the position of the rudder or other steering member is controlled at each instant in accordance with both the angular deviation of a moving body from its course and the angular rate of change of that deviation.

A still further object of the invention is to provide an automatic steering control apparatus in which an electro-optical mathematical solver is employed for the purpose of controlling the prime mover for the rudder or other control member of a moving body in accordance with values of a predetermined function of the angular deviation of the body from its course and of the angular rate of change of such deviation.

According to the invention, electrical values are obtained which are proportional to the angular deviation of the body from a preset course and to the angular rate of change of that deviation. These values may be obtained in any desired manner as, for example, by converting the mechanical movements of an appropriately orientated gyroscope and of a conventional turn indicator into electrical values which are proportional to the angular deviation and angular rate of change of deviation of the body from its course, respectively. These electrical values are then supplied to an electrical solver which provides an electrical output proportional to values of a predetermined function of the angular deviation and angular rate of change of deviation of the body from its course. This predetermined function of the angular deviation and of the angular rate of change of deviation is calculated so as to determine the position which the rudder should have at each instant in order to bring the ship back to its normal direction as fast as theoretically possible and without oscillation. The output from the solver is used to control the motor or other prime mover which moves the rudder.

While the steering control apparatus comprising the invention may be used to control any type of body on any desired course, for purposes of illustration it will be disclosed herein as applied to the automatic control of aircraft in flight over a predetermined course leading to a predetermined destination.

The invention may be better understood from the following detailed description of a preferred embodiment taken in conjunction with the accompanying drawings, in which.

Figure 1:
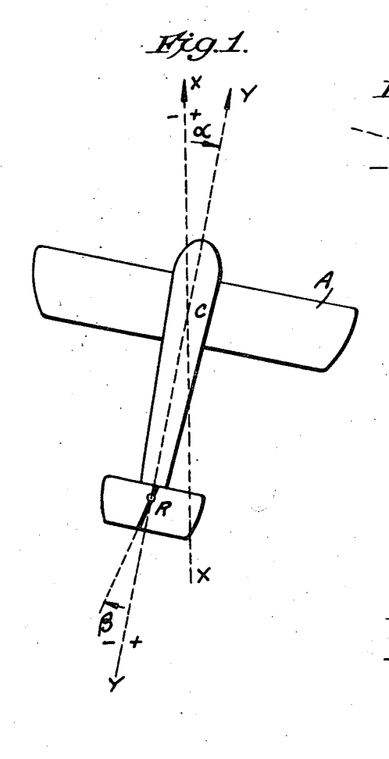
Figure 1 is a schematic diagram of an airplane in flight.

Before proceeding with a detailed description of a preferred embodiment of the invention, it will be helpful to review briefly some theoretical considerations underlying the invention. As shown in Figure 1, the vehicle to be controlled may be, for example, an airplane A having a rudder R and its center of gravity located at the point C. The direction of flight of the airplane A is represented by the line X—X which passes through the center of gravity C. As a result of some disturbance, the airplane A is assumed to have been deviated from its course so that its longitunal axis Y—Y makes an angle $\alpha$ with the direction of flight X—X. The problem then is to control the rudder R in such fashion that the axis Y—Y of the airplane A will be moved as fast as possible into alignment with the direction of flight X—X, and the angular velocity of the airplane A will simultaneously be brought to zero.

It will be assumed in the following discussion that the rudder or other steering control element is always either at rest or moved at a given constant speed to the right or to the left when it is desired to compensate for any deviation of the airplane from its predetermined course; that the prime mover for the rudder starts instantaneously as soon as the control system gives an indication that the rudder should be moved in one direction or the other; and that the prime mover for the rudder will stop automatically when it has given the rudder its full deflection to the right or to the left, or when it has brought the rudder to the desired position.

It will also be understood that most airplanes have automatic stability to a certain extent. In other words, the axis of the airplane has an automatic tendency to return toward the direction of flight whenever a deviation of the axis from the direction of flight has taken place. As a practical matter, there is always automatic stability due to the action of the tail, and the rotational moment traceable to the automatic stability of the airplane must be added to the action of the rudder. In the following description it will be assumed that the rotational moment due to automatic stability is at each instant proportional to the deviation angle $\alpha$, and that its sign is such that it always tends to reduce the angle $\alpha$.

Figure 2:
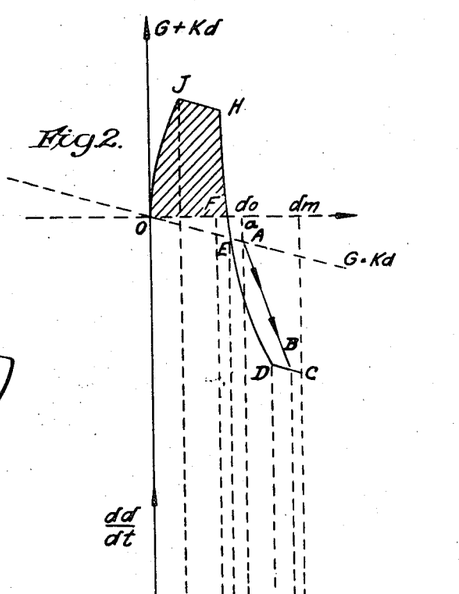
Figures 2 and 3 are graphs showing the relations between the rudder position or rate of change of deviation and the angular deviation of the airplane from its course that should prevail to keep the plane on its course without "hunting"

Figure 2 is a graph showing how the rudder position must be changed for a given initial deviation of the axis of the plane from its direction of flight in order that the angle of deviation may be brought to zero without introducing undesirable oscillations or "hunting." In this figure, the angle $\alpha$, which the axis Y—Y of the airplane A makes with the direction of flight X—X (Figure 1) is taken as the abscissa. The rotational moment G due to the rudder R, plus the rotational moment $K\alpha$ produced by the ordinary stability of the airplane A is taken as the ordinate.

At a given time $t_0$ the rudder R is at its zero position and the airplane A has received a sudden impulse for which the deviation angle $\alpha$ has the value $\alpha_0$. At this instant, the conditions are represented by the point A on Figure 2, on which the ordinate $aA$ represent the rotational moment due to the automatic stability of the airplane A at that instant. According to the invention, the rudder R is immediately moved at constant speed to the left so as to apply a negative rotational moment to the airplane A. When the rudder R has been completely deflected to the left, the conditions correspond to the point B on the graph shown in Figure 2.

Because of the inertia of the plane, the angle $\alpha$ continues to increase, but its angular speed progressively decreases, and the representing point on Figure 2 follows the straight line BC. This part of the diagram is inclined because when $\alpha$ increases, the rotational moment $K\alpha$ due to automatic stability increases in absolute value. The angular velocity of the airplane A having been nullified by the counteraction of the rudder R, the axis Y—Y is now progressively moved toward the direction of flight X—X and the representing point on Figure 2 follows the straight line CD.

At a certain time, which is determined by the automatic steering control apparatus, the rudder R is then moved at a constant speed from its position of maximum deflection to the left to its position of maximum deflection to the right, during which time the representing point on Figure 2 follows the line DEFH. The point E on the curve corresponds to the position where the rudder R is in its zero position. This point does not lie on the axis $0\alpha$ because at this instant of time, there is still some rotational moment given the plane by its automatic stability.

At point H the rudder R has reached its full deflection to the right where it is maintained during a certain time to counteract the inertia which now tends to move the axis Y—Y of the airplane A toward the direction of flight X—X and prevent over-shooting. During this action, which is in effect a braking action, the representing point follows the straight line HJ, the inclination of which results from the effect of the automatic stability component. Shortly before the axis Y—Y of the airplane A comes into alignment with the direction of flight X—X, the rudder R is moved at constant speed from its extreme right-hand position to its zero position, at which time it is automatically brought to rest.

For reasons which will be given hereinafter, it is of interest to know the relation of the angular deviation of the airplane and the angular rate of change of deviation for the sequence of events described above. This relationship is plotted in graph form in Figure 3. The coordinates are α and $$\frac{d\alpha}{dt}$$

Figure 3:
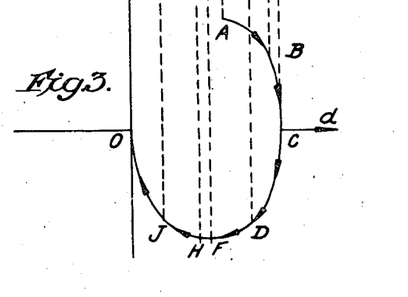

On this curve, the letters used correspond to the letters used in Figure 2. The curve begins at the point A, representing the condition at the instant the control starts after an impulse has given the airplane A an angle of deviation $\alpha_0$ and an angular velocity $$\frac{d\alpha_0}{dt}$$

At the point B the rudder R has reached the position of full return action. At point C the speed is zero; at point D the rudder R begins to move to the braking position; and from point H to point G, the rudder R is in the position of full braking action. At the point J, the rudder begins to return to zero position so that at the point O, α, $$\frac{d\alpha}{dt}$$

and $$\frac{d^2\alpha}{dt^2}$$

simultaneously reach the value zero, and the airplane is at rest in the direction of flight.

It is the function of the automatic steering control apparatus comprising the present invention to determine the instant of time when the rudder R must be moved from the position which tends to bring the axis Y—Y of the airplane A toward the direction of flight X—X to the position in which the action of the rudder R counteracts the inertia of the plane for the purpose of preventing the axis Y—Y from over-shooting the direction of flight X—X. This is accomplished by controlling the rudder R in accordance with a given function of the deviation angle α and the angular rate of change of deviation $$\frac{d\alpha}{dt}$$

Figures 4, 5:
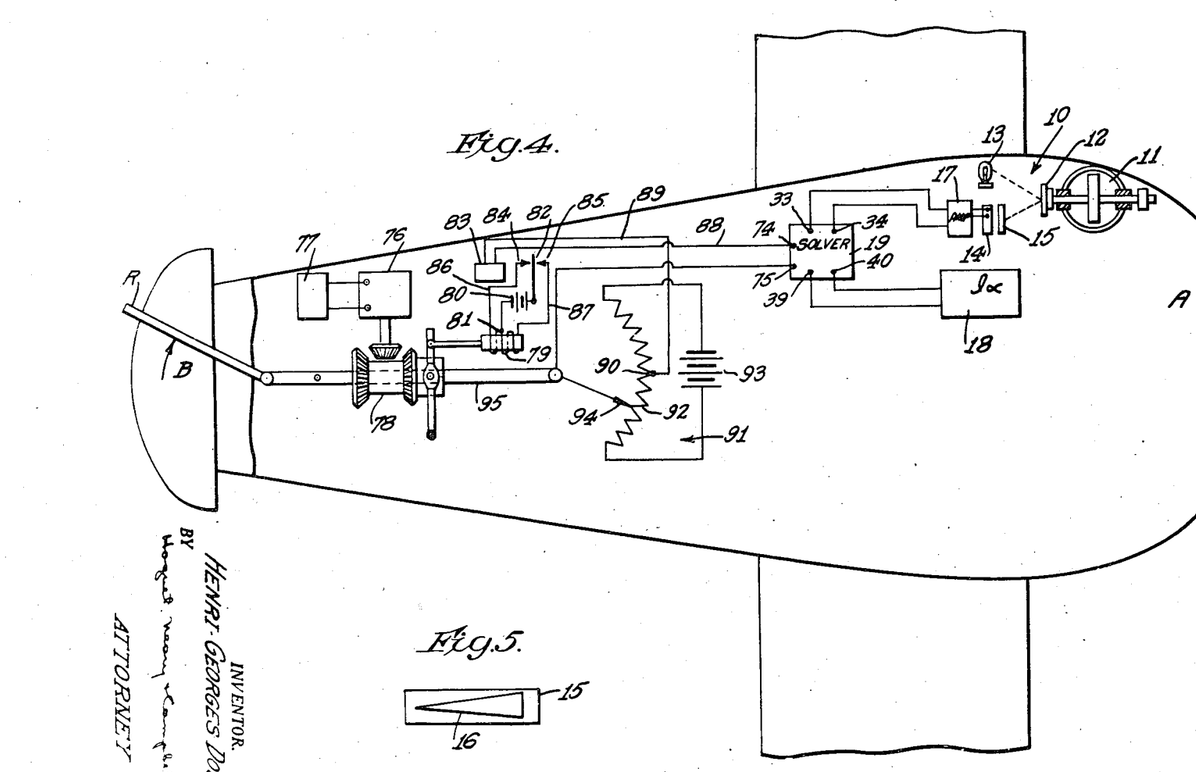
Figure 4 illustrates schematically automatic steering control apparatus constructed according to the invention.
Figure 5 is a detail of the apparatus shown in Figure 4.

Steering control apparatus constructed according to the invention is shown schematically in Figure 4 of the drawings. The apparatus comprises a device 10 for providing electrical values proportional to the deviation angle α between the axis Y—Y of the airplane and the direction of flight X—X (Figure 1). This device may be, for example, a universally mounted gyroscope 11 having a small reflecting surface 12 mounted thereon which moves in proportion to the angle α.

A beam of light is directed to the reflecting surface 12 from a suitable source 13, and the reflected beam is directed to a conventional type photoelectric cell 14 through a screen 15 which is designed to control the amount of light reaching the photoelectric cell 14 in accordance with the angular position of the mirror 12. To this end, the screen 15 may be a suitably designed density wedge, or it may be an opaque member having a tapered slot 16 formed therein, as shown in Figure 5, such that the amount of light transmitted to the photoelectric cell 14 depends upon the angular position of the reflecting member 12. The output of the photoelectric cell 14 is supplied to a conventional type amplifier 17 which provides a direct voltage proportional to the deviation angle α.

Also mounted in the airplane A is a device 18 for providing electrical values proportional to the angular rate of change of deviation $$\frac{d\alpha}{dt}$$

Any suitable apparatus may be used for this purpose, such as, for example, a conventional turn indicator of the type commonly used on airplanes. The electrical output from the amplifier 17 and the device 18 are supplied to an electrical solver 19, the purpose of which is to provide an electrical output which is proportional to values of a predetermined function of the angular deviation α and the angular rate of change of deviation $$\frac{d\alpha}{dt}$$

Figure 6:
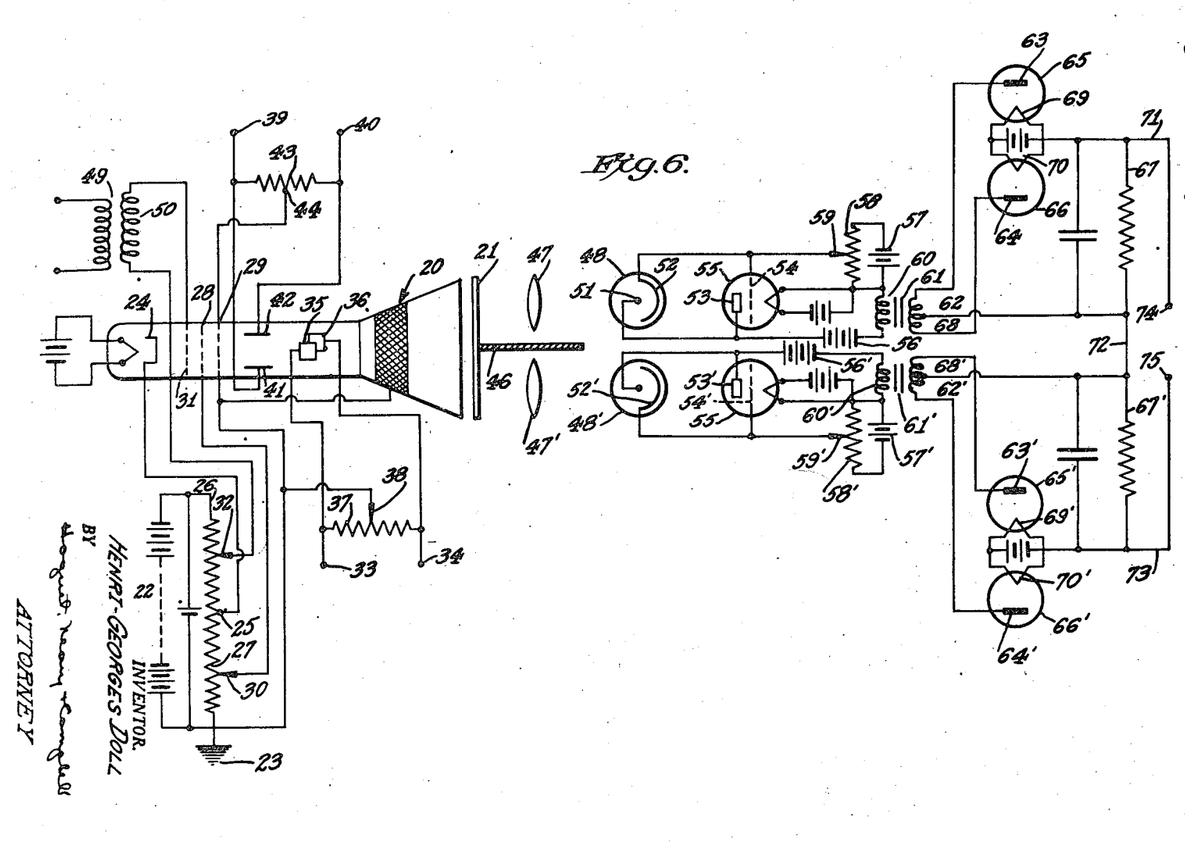
Figure 6 is a schematic diagram of an electro-optical solver which forms part of the apparatus shown in Figure 4.

The solver 19 preferably is of the type disclosed in my copending application for Electro-optical function synthesizer, filed October 19, 1943, Serial No. 506,827, one embodiment of which is disclosed in Figure 6.

Referring to Figure 6, the solver 19 may comprise, for example, a conventional type cathode ray oscilloscope 20 disposed adjacent an optical screen 21, to be described in greater detail hereinafter. The oscilloscope 20 is energized in the conventional manner from a source of electrical energy 22, the positive terminal of which is grounded at 23. The cathode 24 of the oscilloscope 20 is connected to the common point 25 between two resistors 26 and 27 connected across the voltage source 22, and the accelerating electrodes 28 and 29 are connected to the points 30 and 23, respectively, as shown in Figure 5. Negative bias for the control grid 31 is provided by connecting it to the variable contact 32 on the resistor 26.

The output of the amplifier 17, which is proportional to the deviation angle α, is impressed upon the terminals 33 and 34 which are connected to the vertical deflecting plates 35 and 36, respectively, of the oscilloscope 20. Connected across the terminals 33 and 34 is a resistance 37, the mid-tap 38 of which is connected to ground. In similar fashion, the output of the device 18, which is proportional to the angular rate of change of deviation $$\frac{d\alpha}{dt}$$

is impressed upon the terminals 39 and 40 which are connected to the horizontal deflecting plates 41 and 42, respectively, of the oscilloscope 20. A resistor 43 is connected across the terminals 39 and 40, the mid-tap 44 of which is connected to ground.

Figure 7:
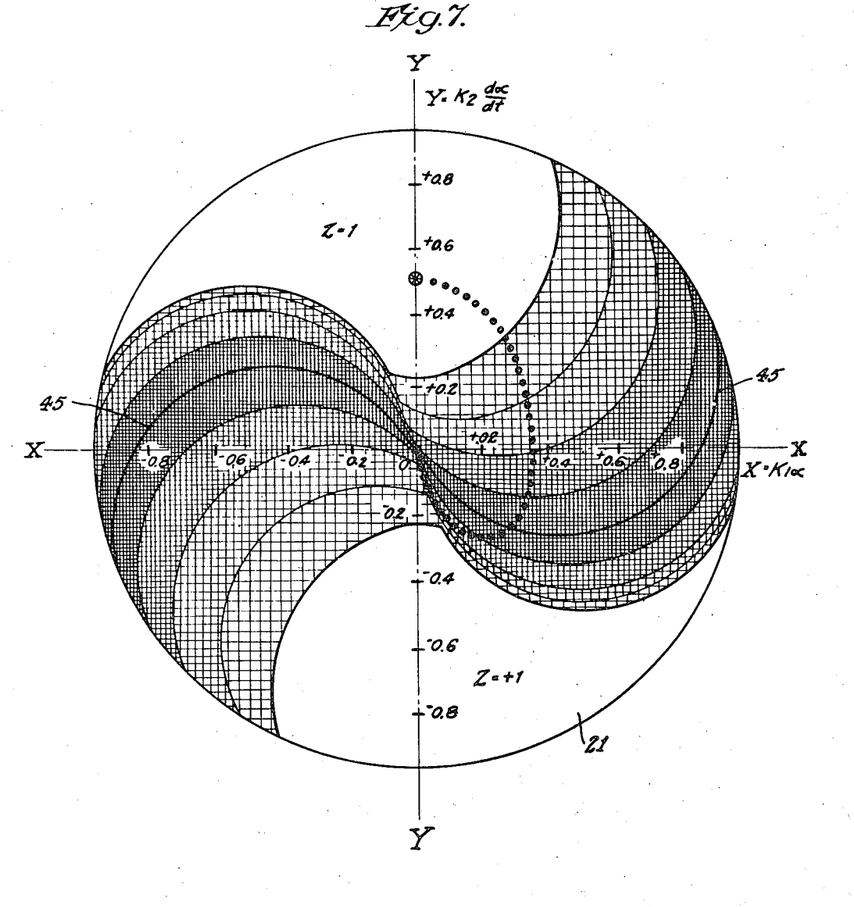
Figure 7 illustrates an optical screen that may be used with the apparatus shown in Figure 4.

The screen 21 is shown in greater detail in Figure 7. As shown in that figure, it is provided with zones of different transparency which are so chosen that for any given values of α and $$\frac{d\alpha}{dt}$$

the mount of light transmitted therethrough at the point corresponding thereto will be proportional to the angle β which should be given the rudder R at that instant for correct compensation in accordance with the cycle illustrated in Figures 2 and 3.

The manner of constructing screens of the type shown in Figure 7 is described in my above mentioned copending application. Briefly, this may be accomplished by computing the value of the function, which in this case is the rudder angle β, corresponding to the different values of the deviation angle α and the angular rate of change of deviation $$\frac{d\alpha}{dt}$$

In the ideal case, the change in transparency from one zone to the other should be gradual. However, it is difficult to make screens in this fashion, and it is preferable to divide the screen 21 up into zones of equal transparency, the transparency of one zone differing from the transparency in the next by about 5 per cent., for example, assuming that it is not desired to obtain the value of the function to a greater degree of accuracy. The values of the function for different values of the two variables can be readily calculated as will be apparent to those skilled in the art.

The fluorescent spot produced on the screen of the cathode ray oscilloscope 20 by the cathode ray beam impinging thereon provides a beam of radiant energy which is transmitted through the screen 21. As indicated above, the intensity of the radient energy will be directly proportional to the desired value of the rudder angle β corresponding to the particular values of the deviation angle α and the angular rate of change of deviation $$\frac{d\alpha}{dt}$$

The entire area of the screen 21 above the line 45 represents negative values of the function, while the entire area below this line represents positive values of the function. In order that electrical values may be obtained corresponding to both positive and negative values of the function, the upper negative area of the screen 21 is isolated from the lower negative area thereof by means of an opaque screen 46 which is disposed perpendicularly to the screen 21 along the line 45.

Located on one side of the opaque screen 46 is a lens 47 which directs light from the screen 21 to a photosensitive device which may be a photoelectric cell 48. A similar lens 47' and photoelectric cell 48' are disposed on the other side of the opaque screen 46. Since the circuits for the photoelectric cells 48 and 48' are identical, it will be necessary to describe only one in detail, corresponding parts in the other being designated by corresponding primed reference characters.

The cathode ray beam should preferably be modulated so as to enable an alternating current amplifier to be used with the photoelectric cell 48. To this end, alternating current is impressed upon the control grid 31 from a transformer 49, the primary winding 50 of which is connected in the circuit of the control grid 31.

The electrodes 51 and 52 of the photoelectric cell 48 are connected to the plate electrode 53 and the control grid electrode 54, respectively, of a conventional type electronic amplifying tube 55. The plate electrode 53 of the tube 55 and the anode 51 of the photoelectric cell 48 are both supplied with electrical energy from a suitable source 56. Grid bias for the electronic tube 55 is provided by a potentiometer comprising a source of voltage 57 and a resistor 58, the variable contact 59 of which is connected to the control grid 54 of the tube 55.

In the plate circuit of the tube 55 is connected the primary winding 60 of a transformer 61, the secondary winding 62 of which is connected to the anodes 63 and 64, respectively, of the rectifying tubes 65 and 66, respectively. The output of the rectifiers 63 and 64 is impressed across a load resistance 67 which is connected at one end to the mid-tap 68 of the transformer secondary winding 62, and at its other end to the filaments 69 and 70 of the rectifiers 65 and 66, respectively. The output resistors 67 and 67' are connected in series by means of the conductors 71, 72 and 73 such that the output at the terminals 74 and 75 is the difference between the voltages appearing across the resistors 67 and 67'.

The electrical output from the terminals 74 and 75 is utilized to actuate a motor for turning the rudder R in the proper direction to compensate for any deviation of the axis Y—Y of the airplane A from its direction of flight X—X. This is perferably accomplished by comparing the electrical output from the terminals 74 and 75 of the solver 19 with a voltage proportional to the position of the rudder R and utilizing the voltage difference to actuate the motor for changing the rudder position.

The rudder R is preferably driven by a constant speed motor 76 from a suitable source 77 through a conventional type reversing mechanism 78 actuated by a solenoid or other suitable device 79. The solenoid 79 is adapted to be energized by a source of electrical energy 80, one terminal of which is connected to the mid-tap 81 of the solenoid 79, and the other terminal of which is connected to a contact arm 82 on a relay 83. Normally, the contact arm 82 is in the central position shown in Figure 4, but is is adapted to be actuated by the relay 83 to engage selectively the contacts 84 and 85 which are connected through the conductors 86 and 87, respectively, to the ends of the solenoid 79.

One terminal of the actuating relay 83 is connected by means of a conductor 88 to the terminal 74 of the solver 19, and its other terminal is connected through a conductor 89 to the mid-tap 90 on a potentiometer 91 comprising a fixed resistance 92 connected in parallel with a source of electrical energy 93. The movable contact 94 of the potentiometer 91 is driven from the same shaft 95 which drives the rudder R. When the rudder R is in its zero position, the contact 94 of the potentiometer 91 engages the resistor 92 at the mid-tap 90, so that the voltage output of the potentiometer 91 is zero. When the rudder R is moved from its zero position to the left, the output of the potentiometer 91 will be directly proportional to the angle β and will have a given polarity, whereas when the rudder R moves from the zero position to the right, the output of the potentiometer 91 will be proportional to the angle β but will have opposite polarity.

Initially, the steering control apparatus is adjusted so that if the rudder R is in a proper position to compensate for any deviation of the axis Y—Y of the airplane A from its direction of flight X—X, the voltage output of the potentiometer 91 is equal in magnitude and opposite in polarity to the voltage output of the terminals 74 and 75 of the solver 19, so that the relay 83 maintains the contact arm out of engagement with the contacts 84 and 85. If, however, the rudder R is not in the preper position for correct compensation, a potential difference will exist in the circuit of the relay 83 so that it will be energized to move the contact arm 82 into engagement with either the contact 84 or the contact 85, depending upon the direction in which the rudder R should be moved to correct for any deviation.

In operation, let it be assumed that an impulse is applied to the airplane so that it is deflected from its direction of flight X—X and angle $\alpha$ as shown in Figure 1. Instantaneously, the device 10 will supply an electrical output to the terminals 33 and 34 of the solver 19 which is directly proportional to the angle $\alpha$. At the same time, the device 18 will supply an electrical output to the terminals 39 and 40 which is directly proportional to the angular rate of change of deviation $$\frac{d\alpha}{dt}$$

The solver, in turn, will provide an electrical output at its terminals 74 and 75 which is directly proportional to the function determined by the characteristics of the optical screen 21. As indicated above, the screen characteristics are so chosen that the electrical output at the terminals 74 and 75 is directly related to the position the rudder R should have at that instant to compensate properly for the angular deviation of the axis Y—Y of the airplane A from the direction of flight X—X.

If the rudder R is not at that instant in the proper position to give correct compensation, the voltage output of the potentiometer 91 will not be the same as the voltage output of the terminals 74 and 75 of the solver 19. As a result, a potential difference will be impressed upon the relay 83, and the contact arm 82 will engage either the contact 84 or contact 85 to cause the rudder R to be moved in the proper direction to bring about correct compensation. When the rudder R reaches the correct position, the voltage output of the potentiometer 91 will be exactly equal in magnitude and opposite in polarity to the voltage output of the terminals 74 and 75 of the solver 19 so that the relay 83 will be de-energized to disconnect the motor 75 from the shaft 95.

While the mathematics involved in the construction of the screen 21 of Figure 7 will be apparent to those skilled in the art, as indicated above, it may be helpful to indicate generally what the equations are. When the rudder is going at constant speed from the left to the right, the dynamic conditions of the airplane are given by the differential equation:

(1) $\quad \dfrac{d^2\alpha}{dt^2} = -\dfrac{K\alpha}{I} + \dfrac{G_M}{I}\dfrac{t}{\frac{T}{2}}$ in which $$\frac{d^2\alpha}{dt^2}$$

is the angular acceleration;

K is the coefficient of automatic stability, that is, the coefficient by which the deviation angle $\alpha$ must be multiplied to give the value of the angular moment produced by the automatic stability;

$\alpha$ is the deviation angle;

I is the moment of inertia of the ship around the vertical axis passing through the gravity center C;

$G_M$ is the maximum moment given by the rudder when it is at full deflection (for the particular speed at which the ship is moving which is supposed to be constant);

t is the time, the time being zero when the rudder starts from the left towards the right;

T is the time it takes for the motor 75 to bring the rudder from full deflection to the left to full deflection to the right.

This equation can be integrated, taking into account, of course, the conditions at the limits which are determined by the particular cycle one has decided to follow and which is represented on Figure 2. From the complete integration of this equation can be deduced the function which determines the curves of equal position of the rudder R, represented on the transparent screen 21 of Figure 7 which is an essential part of the automatic steering system. These equations are the following:

(2) $\begin{cases} x = \dfrac{Z}{2a^2} - \dfrac{1}{2a^3}[\sin a(2u-Z) - 2\sin a(u-Z)] \\ y = \dfrac{1}{2a^2} + \dfrac{1}{2a^3}[\cos a(2u-Z) - 2\cos a(u-Z)] \end{cases}$ which hold for:

(3) $\quad\quad 0 \leq u \leq 1 \quad \text{if} \quad Z < 0$
$\quad\quad Z \leq u \leq 1 \quad \text{if} \quad Z > 0$ (4) $x = \dfrac{Z}{2a^2} -$ $\dfrac{1}{2a^3}[\sin a(u+1-Z) - \sin a(u-Z) - \sin a(1-Z)]$ $y = \dfrac{1}{2a^2} +$ $\dfrac{1}{2a^3}[\cos a(u+1-Z) - \cos a(u-Z) - \cos a(1-Z)]$ which hold when:

(5) $\quad\quad u \geq 1$ in this equation:

(6) $\quad x = K_1\alpha \quad$ with: $K_1 = \dfrac{2I}{G_M T^2}$ $\quad y = K_2\dfrac{d\alpha}{dt} \quad$ with $K_2 = \dfrac{I}{G_M T}$ $\quad a = \dfrac{T}{2}\sqrt{\dfrac{K}{I}}$ Z = relative rudder angle (ratio of rudder angle to maximum positive rudder angle).

It can be remarked that the relative rudder angle Z is not given directly as a function of $x$ and $y$ like:

(7) $\quad\quad Z = f(x, y)$ but as a system of two equations of the type:

(8) $\quad\quad x = g(Z, u)$
$\quad\quad y = h(Z, u)$

The system of equations (8) could be brought back to the type (7) if it were easy to eliminate $u$ between the two equations (8). Because the equations are rather complicated, this elimination is difficult, and it is therefore not practical to calculate the lines of equal Z represented on Figure 7. For each value of Z, $x$ and $y$ are calculated for a succession of values of $u$ comprised within the limits given by the relations (3) and (5) and therefore a certain number of points the line of equal Z corresponding to that particular value of Z are determined by their two coordinates $x$ and $y$. The curve is then traced graphically from one point to another.

It is to be noted that each curve is determined by a different system of equations depending on whether $u$ is smaller or bigger than 1. For the value $u=1$, the systems of equations are equivalent and the two parts of each curve corresponding respectively to each system of equations join each other at the point corresponding to $u=1$.

The system of equations given corresponds to the lines of equal Z which are on the right part of Figure 7. The curves on the left part are symmetrical with the curves on the right-hand side, with respect to the center of the figure.

It can be seen from the above formulae which characterize the ideal cycle of Figure 2 for given dynamic characteristics of the ship and for a given speed of displacement of the rudder that simple systems of combination of the deviation angle and of the angular velocity like the mechanical systems used in prior art apparatuses, which can give only linear combinations of $x$ and $y$ like, for example:

(9) $\qquad Z = ax + by$ are unable to solve the problem as stated. It is therefore impossible with the prior are apparatuses to realize the ideal cycle of Figure 2, which is the one for the conditions given which permits the ship to be brought back to the normal direction as fast as possible without oscillation.

It will be apparent from the foregoing that the novel automatic steering apparatus herein described is of special utility for controlling vehicles, such as airplanes, in which weight requirements are very critical. By employing an electro-optical solver for controlling the rudder motor in accordance with variations in the angular deviation and the angular rate of change of deviation, the operation of the apparatus is made instantaneous and its weight is much less than the weight of prior art apparatus involving mechanical solvers which utilize mechanical elements having relatively large masses.

The principal advantage of the apparatus according to invention over prior art apparatuses is that the electro-optical solver permits the "rudder angle" to be obtained at each instant by the best possible combination of the values measured for the angular deviation and for the angular velocity, however, complicated this combination might be mathematically. It therefore permits the ship to be brought back to its normal direction as fast as theoretically possible and without oscillation, a result quite impossible to achieve with the prior art apparatuses in which only a very simple combination (addition or subtraction) of the angular deviation and of the angular velocity could be obtained.

The embodiment described above indicates how the novel automatic steering control apparatus of the invention may be used to keep a body, such as an airplane, for example, on a predetermined course which is its direction of flight. It will be apparent to those skilled in the art, however, that the same apparatus can be used equally well to compensate for rolling or pitching movements of a vehicle about other axes than the vertical one. The apparatus is also of exceptional utility for controlling the steering of vehicles such as, for example, seagoing vessels.

While an embodiment has been described above, the invention is not intended to be in any way limited thereby, but is susceptible of numerous changes in form and detail within the scope of the appended claims.

I claim:

1. In automatic steering control apparatus for steering a body, the combination of a steering member, power means for said steering member, electrical means providing an output proportional to the angular deviation of said body from a predetermined course, second electrical means providing an output proportional to the angular rate of change of said deviation, an electrical solver adapted to receive the outputs of said first and second electrical means and to provide an output proportional to a predetermined and non-linear function of said deviation and rate of change of deviation, said function defining substantially the correct instantaneous position of said steering member for steering without appreciable hunting, and electrical means responsive to the output of said solver for controlling said power means.

2. In automatic steering control apparatus for steering a body, the combination of a steering member, power means for operating said steering member, means providing an electrical output that is proportional to a predetermined and non-linear function of the angular deviation of said body from a predetermined course and of the rate of change of said deviation, said last named output defining substantially the correct instantaneous position of said steering member for steering without appreciable hunting, electrical means providing an electrical output that is a function of the position of said steering member, and means responsive to both said electrical outputs for controlling said power means.

3. In automatic steering control apparatus for steering a body, the combination of a steering member, power means for moving said steering member, means providing an electrical output that is proportional to a predetermined and non-linear function of the angular deviation of said body from a predetermined course and of the rate of change of said deviation, said last named output defining substantially the correct instantaneous position of said steering member for steering without appreciable hunting, electrical means providing an electrical output whose magnitude and polarity are a function of the position of said steering member, and means responsive to the difference between said electrical outputs for controlling said power means.

4. In automatic steering control apparatus for steering a body, the combination of a steering member, power means for said steering member, electrical means providing an output proportional to the angular deviation of said body from a predetermined course, second electrical means providing an output proportional to the angular rate of change of said deviation, an electrical solver adapted to receive the outputs of said first and second electrical means and to provide an output proportional to a predetermined and non-linear function of said deviation and rate of change of deviation, said function defining substantially the correct instantaneous position of said steering member for steering without appreciable hunting, electrical means providing a second electrical output whose magnitude and polarity are a function of the position of said steering member, and electrical means responsive to a function of the output of said solver and of said second electrical output for controlling said power means.

5. In automatic steering control apparatus for steering a body, the combination of a steering member, power means for operating said steering member, means sensitive to the angular deviation of said body from a predetermined axis of reference, second means sensitive to the rate of change of said angular deviation, an electrical solver for receiving electrical inputs from said first and second sensitive means and for providing an electrical output proportional to a predetermined and non-linear function of said angular deviation and rate of change of deviation, said function defining substantially the correct instantaneous position of said steering member for steering without appreciable hunting, and electrical means responsive to the output of said solver for controlling said power means.

6. In automatic steering control apparatus for steering a body, the combination of an angularly movable steering member, means sensitive to the angular deviation of said body from a predetermined axis of reference, second means sensitive to the angular rate of change of said deviation, means controlled by said first and second means and displaceable along right angularly related coordinates through distances proportional to said angular deviation and said angular rate of change, respectively, means for detecting said displaceable means and providing an output and means for modifying said output in accordance with a predetermined and non-linear function of said angular deviation and rate of change to provide a quantity proportional to the angle to be assumed by said steering member to return said body to said axis of reference, said function defining substantially the correct instantaneous position of said steering member for steering without appreciable hunting.

7. In automatic steering control apparatus for steering a body, the combination of means sensitive to the angular deviation of said body from a predetermined axis of reference, second means sensitive to the angular rate of change of said deviation, means providing a beam of radiant energy, means for modifying said beam in accordance with a predetermined function of the outputs of said first and second sensitive means, said function defining substantially the correct instantaneous position of a steering member for steering without appreciable hunting, and a photosensitive device in the path of said modified beam.

8. In automatic steering control apparatus for steering a body, the combination of means sensitive to the angular deviation of said body from a predetermined axis of reference, second means sensitive to the angular rate of change of said deviation, means providing a beam of radiant energy, means for displacing said beam in different directions in accordance with the outputs of said first and second sensitive means, an optical screen in the path of said beam for modifying said beam in accordance with the instantaneous values of a predetermined function of said deviation and rate of change of deviation, said function defining substantially the correct instantaneous position of a steering member for steering without appreciable hunting, and a photosensitive device disposed to receive said modified beam.

9. In automatic steering control apparatus for steering a body, the combination of means sensitive to the angular deviation of said body from a predetermined axis of reference, second means sensitive to the angular rate of change of said deviation, a cathode ray oscilloscope having means for deflecting the cathode ray beam in at least two different directions, means for applying to said deflecting means the outputs of said first and second sensitive means, thereby producing a radiant energy trace on said oscilloscope screen that is displaced in different directions proportionally to the magnitudes of said angular deviation and rate of change of deviation, a photosensitive device disposed to receive radiant energy from said trace, and an optical screen for modifying the intensity of the radiant energy which reaches the photosensitive device in accordance with instantaneous values of a predetermined function of said deviation and rate of change of deviation, said function defining substantially the correct instantaneous position of a steering member for steering without appreciable hunting.

10. In automatic steering control apparatus for steering a body, the combination of means providing a first electrical output proportional to the deviation of said body from an axis of reference, means providing a second electrical output proportional to the rate of change of said deviation, means providing a beam of radiant energy, means for modifying said beam in accordance with a predetermined function of said first and second electrical outputs, said function defining substantially the correct instantaneous position of a steering member for steering without appreciable hunting, photosensitive means in the path of said beam, a steering member, power means for said steering member, and electrical means for controlling said power means in accordance with a function of the output of said photosensitive means.

11. In automatic steering control apparatus for steering a body, the combination of means providing a first electrical output proportional to the deviation of said body from an axis of reference, means providing a second electrical output proportional to the rate of change of said deviation, means providing a beam of radiant energy, means for displacing said beam in different directions in accordance with said first and second outputs, an optical screen in the path of said beam for modifying said beam in accordance with a predetermined function of said deviation and rate of change of deviation, said function defining substantially the correct instantaneous position of a steering member for steering without appreciable hunting, photosensitive means in the path of said modified beam, a steering member, power means for said steering member, and electrical means for controlling said power means in accordance with a function of the output of said photosensitive means.

12. In automatic steering control apparatus for steering a body, the combination of means providing a first electrical output proportional to the deviation of said body from an axis of reference, means providing a second electrical output proportional to the rate of change of said deviation, a cathode ray oscilloscope having means for deflecting the cathode ray beam in at least two different directions, means for applying to said deflecting means said first and second electrical outputs, thereby producing a radiant energy trace on said oscilloscope screen that is displaced in different directions proportionally to the magnitudes of said deviation and rate of change of deviation, photosensitive means disposed to receive radiant energy from said trace, an optical screen for modifying the intensity of the radiant energy which is received by the photosensitive means in accordance with a given function of said deviation and rate of change of deviation, said function defining substantially the correct instantaneous position of a steering member for steering without appreciable hunting, a steering member, power means for said steering member, and electrical means for controlling said power means in accordance with a function of the output of said photosensitive means.

13. In automatic steering control apparatus for steering a body, the combination of means providing a first electrical output proportional to the deviation of said body from an axis of reference, means providing a second electrical output proportional to the rate of change of said deviation, a cathode ray oscilloscope having means for deflecting the cathode ray beam in at least two different directions, means for applying to said deflecting means said first and second electrical outputs, thereby producing a radiant energy trace on said oscilloscope screen that is displaced in different directions proportionally to the magnitudes of said deviation and rate of change of deviation, photosensitive means disposed to receive radiant energy from said trace, an optical screen for modifying the intensity of the radiant energy which is received by the photosensitive means in accordance with a given function of said deviation and rate of change of deviation, said function defining substantially the correct instantaneous position of a steering member for steering without appreciable hunting, a steering member, power means for said steering member, means providing a voltage that is a function of the position of said steering member, and electrical means for controlling said power means in accordance with a function of said voltage and the electrical output from said photosensitive means.

14. In automatic steering control apparatus for steering a body, the combination of means providing a first electrical output proportional to the deviation of said body from an axis of reference, means providing a second electrical output proportional to the rate of change of said deviation, a cathode ray oscilloscope having means for deflecting the cathode ray beam in at least two different directions, means for applying to said deflecting means said first and second electrical outputs, thereby producing a radiant energy trace on said oscilloscope screen that is displaced in different directions proportionally to the magnitudes of said deviation and rate of change of deviation, photosensitive means disposed to receive radiant energy from said trace, an optical screen for modifying the intensity of the radiant energy which is received by the photosensitive means in accordance with a given function of said deviation and rate of change of deviation, said function defining substantially the correct instantaneous position of a steering member for steering without appreciable hunting, a steering member, power means for said steering member, means providing a voltage whose magnitude and polarity are a function of the position of said steering member, and electrical means for controlling said power means in accordance with a function of the difference between said voltage and the output of said photosensitive means.

15. In automatic steering control apparatus for steering a body, the combination of a steering member, power means for operating said steering member, means sensitive to the angular deviation of said body from a predetermined axis of reference, a second means sensitive to the rate of change of said angular deviation, a solver for producing at each instant a quantity which is a predetermined and nonlinear function of said angular deviation and rate of change and which represents the position that should be occupied at that instant by the steering member for proper steering, means furnishing a quantity responsive to the position of the steering member at each instant, means to automatically compare the two said quantities, and means controlling the power operating the steering member according to the result of said comparison so that the steering member is quickly moved toward the position it should occupy.

HENRI-GEORGES DOLL.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,703,317 | Minorsky | Feb. 26, 1929 |

Certificate of Correction

Patent No. 2,463,362.  March 1, 1949.

HENRI-GEORGES DOLL

It is hereby certified that errors appear in the printed specification of the above numbered patent requiring correction as follows:

Column 8, line 33, for the word "is" first occurrence read *it*; line 68, for "preper" read *proper*; column 10, lines 22 and 27, after that portion of the equation in each occurrence reading "a(1-Z)" insert a closing bracket; lines 24 and 25, same column, for "$y-\frac{1}{2a^2}+$" read $y=\frac{1}{2a^2}+$; lines 37 to 39, for "$a=\frac{T}{2}\sqrt{\frac{K}{I}}$" read $a=\frac{T}{2}\sqrt{\frac{K}{I}}$; column 11, line 13, for "are" read *art*;

and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*